Patented Apr. 4, 1950

2,503,195

UNITED STATES PATENT OFFICE 2,503,195

SYNTHETIC RUBBER COPOLYMER OF A BUTADIENE HYDROCARBON AND ORTHO-N-ACRYLYL OR METHACRYLYL AMINO BIPHENYL

Alfred B. Craig and William H. Yanko, Dayton, Ohio, assignors to Monsanto Chemical Company, St. Louis, Mo., a corporation of Delaware No Drawing. Application December 4, 1947,
Serial No. 789,774

4 Claims. (Cl. 260—82.1)

This invention relates to new synthetic rubber compositions having very desirable properties as are hereinafter described. More particularly the invention relates to copolymers of a hydrocarbon diene and a comonomer which is an amide of o-amino-biphenyl and acrylic or methacrylic acids.

Synthetic rubber made by the copolymerization of hydrocarbon dienes, for example butadiene, and N-aryl-acrylamides are known to the art, but many of these copolymers have undesirable properties. Some N-aryl-acrylamides are insoluble in butadiene and therefore produce copolymers of very low strength which are apparently heterogeneous compositions and not true copolymers. Other N-aryl-acrylamides are not polymerizable in the presence of butadiene.

The fundamental purpose of this invention is to prepare a new synthetic rubber having physical properties superior to commercial butadiene-styrene rubber. A further purpose of this invention is to prepare a new synthetic rubber having quite different properties than related copolymers of the prior art.

In accordance with this invention it has been found that hydrocarbon dienes, particularly those having the structural formula:

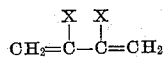

wherein X is a radical of the group consisting of methyl and hydrogen, for example isoprene, butadiene, and 2,3-dimethyl butadiene, may be copolymerized with N-acrylyl-o-aminobiphenyl or N-methylyl-acrylyl-o-aminobiphenyl to form synthetic rubbers having unusual physical properties. It has been found that copolymers of 40 to 90 percent of the diene and from 10 to 60 percent of the N-substituted acrylyl amides are exceptional synthetic rubbers.

The polymerizations are effected in aqueous emulsions in the presence of an oxygen yielding catalyst, such as sodium perborate, hydrogen peroxide, sodium persulfate and other peroxy compounds or salts of peroxy acids having the molecular grouping (—O—O—), from 0.005 to 1.0 percent by weight being used. The aqueous emulsions may be stabilized by the presence of a small amount, for example from 1 to 5 percent by weight, of a substance having both hydrophobic and hydrophilic radicals, such as rosin soap, sulfonated hydrocarbons, water soluble salts of sulfuric acid esters of long chain alkyl alcohols, triethanolamine and other amino soaps, the water soluble salts of high molecular weight fatty acids including the mixtures obtained by saponification of animal and vegetable fats, and other similar compounds.

The polymerizations may be conducted by charging the mixed monomers, water, peroxy catalyst, and emulsifying agent into a suitable reactor which is provided with a means for agitating the reaction mass. The agitation may be accomplished by tumbling the reactor, by stirring the contents with a suitable rotary stirring mechanism, or by any other means which promotes the intimate contact between monomer and the various reagents charged to the vessel. During the reaction the vessel and its contents are maintained at a temperature between 30 and 80° C., for the purpose of inducing a rapid polymerization. Since the polymerization reaction evolves heat, care should be taken to avoid excessive temperatures and reaction rates such that the heat of polymerization cannot be removed from the reaction vessel. The temperature of polymerization should be so controlled that a uniform rate of polymerization is achieved throughout the reaction. When the polymerization is complete, or substantially complete, the emulsion is precipitated by the addition of water soluble salts, acids or alcohols, or any other substance which destroys the effectiveness of the emulsifying agent and permits the separation of aqueous liquor from the solid particles of copolymer by filtration. The copolymer may then be pressed into suitable sized cakes for storage or further processing. The new rubber is compounded with the usual vulcanizing agents, for example antioxidants, accelerators and pigments by milling in any conventional manner, for example on roll mills or in Banbury mixers.

The new rubber is a good general purpose rubber but is especially suitable in applications requiring high tensile strength and elongation.

Further details of the preparation and compounding of the new rubber are set forth with respect to the following example.

Example

To demonstrate the unusual chemical and physical properties of the o-acrylyl aminobiphenyl and the synthetic rubbers produced by copolymerization with dienes, copolymers of 75 percent of butadiene and each of 25 percent of one of the following monomers were prepared:

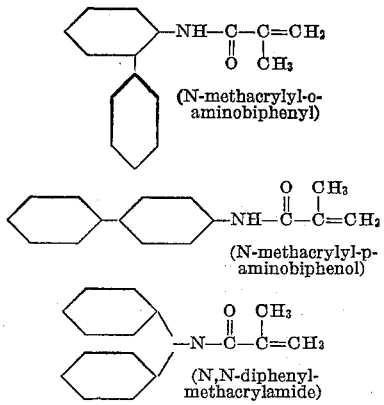

(N-methacrylyl-o-aminobiphenyl)

(N-methacrylyl-p-aminobiphenol)

(N,N-diphenyl-methacrylamide)

As a control a copolymer of 75 percent butadiene and 25 percent styrene was also prepared.

Each of the above monomers was made into copolymers by charging the following reagents into 1.6 liter steel bombs.

| | |
|---|---|
| Comonomer _____ grams__ | 75 |
| Butadiene _____ do____ | 225 |
| Distilled water _____ cc.___ | 750 |
| Soap (principally sodium stearate) __grams__ | 15 |
| Potassium persulfate _____ do____ | 0.9 |
| Dodecyl mercaptan _____ do____ | 1.5 |

The bombs were provided with pressure gauges for following the course of the reaction. As soon as the temperature of 50° C. had been attained the pressure observed was 50 pounds per square inch. The reactions were conducted at 50° C. by tumbling the bombs in a circulating hot air oven. The polymerizations were continued until the total pressures in the bombs at 50° C. were less than 25 pounds per square inch.

Antioxidant emulsions were prepared by dissolving 4.5 grams of a reaction product of acetone and p-aminobiphenyl in 25 ml. of benzene. These mixtures were then added with stirring to solutions of 0.75 gram of soap and 75 cc. of water. One of the resulting emulsions was added to each of the latices prepared in accordance with the above polymerization. The latices were then coagulated by the addition of an equal portion of a solution of 189 grams of sodium chloride and 1.64 grams of aluminum sulfate in a mixture of 1.64 ml. of a glacial acetic acid, 1330 ml. of distilled water and 300 ml. of isopropyl alcohol. The precipitates resulting from coagulations were separated by filtration, washed with distilled water, and dried in a circulating hot air oven.

Each of the copolymers were compounded using the following formulation.

| | Parts by weight |
|---|---|
| Copolymer _____ | 100.0 |
| Black (Kosmobile 77) _____ | 40.0 |
| Zinc oxide _____ | 3.0 |
| Stearic acid _____ | 1.0 |
| Reaction product of acetone and p-aminobiphenyl _____ | 1.0 |
| Sulfur _____ | 2.0 |
| N-cyclohexal-2-benzothienyl sulfenamide__ | 1.2 |

Each composition was thoroughly mixed on a cold laboratory roll mill and the samples sheeted, cut into test strips and cured by heating at 142° C. for both 60 and 90 minutes. The test strips were evaluated using standard test methods for determining tensile strength and elongation. The following table demonstrates the physical properties observed:

| Comonomer | Minutes Cure | Tensile Strength, lbs. per sq. in. | Elongation Per cent |
|---|---|---|---|
| N-methacrylyl-o-aminobiphenyl____ | 60 | 3,040 | 350 |
| | 90 | 3,135 | 350 |
| N-methacrylyl-p-aminobiphenyl____ | 60 | 1,790 | 165 |
| | 90 | 1,520 | 140 |
| N,N-diphenyl-methacrylamide_____ | (Did not copolymerize) | | |
| Styrene_____ | 60 | 2,315 | 340 |
| | 90 | 1,975 | 300 |

Although this invention has been described with respect to specific embodiments, it is not intended that the scope shall be limited by the details thereof, except to the extent incorporated in the following claims.

1. A synthetic rubber composition which comprises a copolymer of 40 to 90 percent of a hydrocarbon diene having the structural formula:

$$CH_2=\overset{X}{\underset{}{C}}-\overset{X}{\underset{}{C}}=CH_2$$

wherein X is a radical of the group consisting of hydrogen and methyl, and from 10 to 60 percent of a compound having the structural formula:

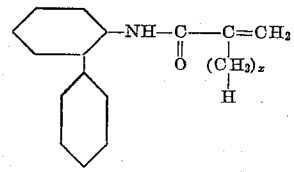

wherein X is a small whole number from 0 to 1 inclusive.

2. A synthetic rubber which comprises a copolymer of 40 to 90 percent of butadiene and from 10 to 60 percent of a compound having the structural formula:

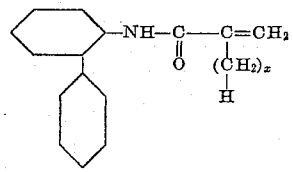

wherein X is a small whole number from 0 to 1 inclusive.

3. A synthetic rubber composition which comprises a copolymer of 40 to 90 percent of butadiene and from 10 to 60 percent of o-N-methacrylyl aminobiphenyl.

4. A synthetic rubber composition which comprises a copolymer of 40 to 90 percent of butadiene and from 10 to 60 percent of o-N-acrylyl aminobiphenyl.

ALFRED B. CRAIG.
WILLIAM H. YANKO.

REFERENCES CITED

The following references are of record in the file of this patent:

UNITED STATES PATENTS

| Number | Name | Date |
|---|---|---|
| 2,288,197 | Kranzlein et al. | June 30, 1942 |
| 2,384,574 | Stewart et al. | Sept. 11, 1945 |
| 2,385,182 | Anderson et al. | Sept. 18, 1945 |
| 2,401,885 | Semon | June 11, 1946 |